United States Patent Office 3,723,151
Patented Mar. 27, 1973

3,723,151
DISPERSING AGENTS
Margaret Peddie Backhouse, South Ascot, Arthur Topham, Middleton, and Bernard Tury, Kemptown, England, assignors to Imperial Chemical Industries Limited, London, England
No Drawing. Filed Aug. 20, 1971, Ser. No. 173,628
Claims priority, application Great Britain, Sept. 7, 1970, 42,760/70; Nov. 13, 1970, 54,130/70
Int. Cl. C08h 17/02
U.S. Cl. 106—308 Q    4 Claims

ABSTRACT OF THE DISCLOSURE

A dispersant comprising the reaction product of (a) a compound of the formula:

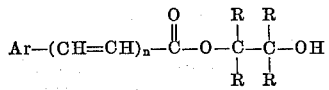

wherein Ar is an aromatic group, $n$ is 0 or 1, from 2 to 3 R groups are individually hydrogen, methyl and ethyl and the remaining R group or groups individually or the remaining group R—C—C—R in combination provides a solvatable chain-like component of at least 12 links, or (b) an addition polymer compound which is solvated by an organic liquid and which contain at least one group of the formula:

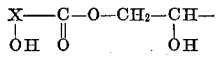

wherein X is an aliphatic radical which optionally contains an additional hydroxy group or groups, with an organic monoisocyanate or with an organic diisocyanate which has already been or is simultaneously or subsequently reacted with an alcohol or amine so that in effect it behaves as a monoisocyanate and the use of the said dispersant for preparing dispersions of solids in organic liquids.

---

This invention relates to new dispersing agents which are valuable for use in dispersion of solid particles, preferably textile auxiliaries, dyestuffs and above all pigments, in organic liquids.

In British specification No. 1,108,261 there are described and claimed dispersants having the formula:

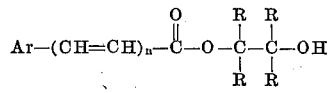

wherein Ar is an aromatic group, $n$ is 1 or 0, from 2 to 3 R groups are individually hydrogen, methyl or ethyl and the remaining R group or groups individually or the remaining group R—C—C—R in combination provides a solvatable chain-like component of at least 12 links. The specification defines the term "solvatable" and gives examples of the solvatable chain-like components having at least 12 links which are present in the said dispersants.

Also in British specification No. 1,159,252 there are described dispersants comprising an addition polymer chain solvated by an organic liquid and having attached thereto at least one group of the formula:

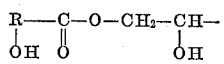

wherein R is an aliphatic radical which may contain one or more additional hydroxy groups. The specification also defines the term "solvated" and gives examples of the addition polymer chains.

Although the dispersants described in British specifications Nos. 1,108,261 and 1,159,252 are very effective dispersing agents, chiefly for obtaining dispersions of solids in organic liquids, it has now been found that their activity as dispersing agents can be further improved by treating them with an organic isocyanate.

According to the invention there are provided as dispersants the reaction products of (a) the compounds of the formula:

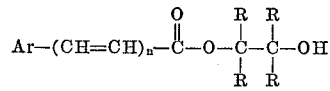

wherein Ar is an aromatic group, $n$ is 0 or 1, from 2 to 3 R groups are individually hydrogen, methyl and ethyl and the remaining R group or groups individually or the remaining group R—C—C—R in combination provides a solvatable chain-like component of at least 12 links, or (b) addition polymer compounds which are solvated by an organic liquid and which contain at least one group of the formula:

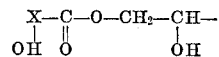

wherein X is an aliphatic radical which optionally contains an additional hydroxy group or groups, with an organic monoisocyanate or with an organic diisocyanate which has already been or is simultaneously or subsequently reacted with an alcohol or amine so that in effect it behaves as a monoisocyanate.

The reaction of the said organic compounds with the isocyanate is preferably carried out in the presence of a catalyst, such as stannous octoate, N:N-dimethyl-cyclohexylamine, dibutyl tin dilaurate or diazabicyclooctane, which is known to promote the reaction between isocyanates and compounds containing hydroxy groups.

The reaction is preferably carried out by stirring the said organic compound and the isocyanate together in an inert organic liquid, such as white spirit, petroleum fractions, benzene and xylene, preferably in the presence of a catalyst, at a temperature between 10° C. and the boiling point of the reaction medium. The resulting product can then be isolated by conventional methods, for example by distilling off the inert organic liquid. However, for many purposes, the dispersants of the present invention are used in the form of solutions in organic liquids, and accordingly in such cases it is not necessary to isolate the new dispersants, the resulting solutions of the new dispersants being used directly.

Some of the organic compounds used as starting materials also contain as amino group or groups in which case there will also be reaction of these with the monoisocyanate.

In reacting the said organic compounds with the monoisocyanate it is not essential that 1 mol of isocyanate be used for each hydroxy or amino group present in the organic compound. Less than 1 mol of isocyanate can be used in which case not all the hydroxy or amino group or groups are reacted, but it is preferred to use not less than 0.5 mol of monoisocyanate for each hydroxy or amino group present. More than 1 mol of monoisocyanate but preferably not exceeding 2 mols can be used for each hydroxy or amino group present in which case the urethane groups (—NHCOO—) obtained by reaction of the hydroxy groups with the isocyanate are wholly or partly converted to allophanate groups.

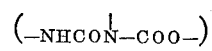

and the urea (—NHCONH—) groups obtained by reaction of the amino groups with the isocyanate are wholly or partly converted to biuret

groups.

Accordingly, in general, the dispersants of the present invention, comprise a mixture of products.

As examples of organic monoisocyanates which can be used to obtain the dispersants of the present invention there may be mentioned methyl isocyanate, ethyl isocyanate, cyclohexyl isocyanate, phenyl isocyanate and p-tolyl isocyanate.

When using organic diisocyanates to obtain the dispersants of the present invention it is essential to ensure that both isocyanate groups do not react to any marked extent with the organic compounds used as starting materials otherwise cross-linking occurs, and the resulting products are solvent-insoluble three dimensional polymers. This cross-linking is overcome by previously reacting the diisocyanate with one molecular proportion of an alcohol or an amine so that in effect the diisocyanate is converted to a monoisocyanate which is substituted by a urethane or urea group, or by reacting the organic compounds used as starting materials with the diisocyanate under such conditions that only one of the isocyanate groups in the diisocyanate molecule reacts with the said organic compounds, and then reacting the other isocyanate group with an alcohol or an amine, or by reacting the organic compound with the diisocyanate in the presence of an alcohol or amine which is more high reactive towards the diisocyanate than the said organic compound.

As examples of organic diisocyanates there may be mentioned m- or p-phenylenediisocyanate, hexamethylenediisocyanate, and preferably 2:4- or 2:6-tolylene diisocyanate and mixtures thereof.

As examples of alcohols and amines which are reacted with the diisocyanate there may be mentioned alkanols such as methanol, ethanol, n-propanol, n-butanol, oleyl alcohol, cetyl alcohol and dodecanol; primary and secondary amines of the benzene series such as aniline and N-methylaniline; and primary and secondary alkylamines such as methylamine, diethylamine, dibutylamine and oleylamine.

The organic compounds used as starting materials to prepared the new dispersants of the present inventions are as described in British specifications Nos. 1,108,261 and 1,159,252.

The dispersants of the present invention are of particular value in the preparation of dispersions of solids in organic liquids, as, when the solids are dispersed in organic liquids in the presence of the said dispersants, there are obtained finely divided well deflocculated dispersions of the solids, and such dispersions constitute a further feature of the invention.

According to a further feature of the invention there are provided dispersions of solids in organic liquids which contain dissolved therein one or more of the above defined dispersants.

The said dispersions can be obtained by any of the conventional and well known methods of preparing dispersions. Thus the solid, organic liquid and dispersant or mixture of dispersants may be mixed in any order and the mixture then subjected to a mechanical treatment to reduce the particle size of the solid, for example by ball milling, bead milling or gravel milling until the dispersion is formed.

Alternatively the solid can be treated to reduce its particle size independently or in admixture with either the organic liquid or the dispersant, and the other ingredient or ingredients then added following which dispersion can be obtained by stirring the mixture. Compositions obtained in this way and comprising a solid in finely divided form and one or more of the said dispersants are a further feature of the invention.

It is preferred that the amount of dispersant present in the dispersions is such as corresponds to between 5 and 50% by weight based on the weight of the solid, and the dispersions preferably contain from 5 to 50% by weight of the solid based on the total weight of the dispersion.

The solid can be any inorganic or organic compound which is substantially insoluble in the organic solvent at the temperature concerned. If desired the solid can be a colourless inorganic compound such as an alkali metal salt, carbonate, bicarbonate or hydroxide. It is however preferred that the solid be an inorganic or organic pigment, a dyestuff, a textile finishing agent or other organic compound, such as urea, which is commonly used in solvent coloration processes for textile materials.

As examples of inorganic pigments there may be mentioned titanium dioxide, carbon black, zinc oxide, Prussian Blue, cadmium sulphide, iron oxides, vermillion, ultramarine and chrome pigments including chromates of lead, zinc, barium and calcium and the various mixtures and modifications thereof such as are commercially available as greenish-yellow to red pigments under the names primrose, lemon, middle, orange, scarlet and red chromes.

As examples of organic pigments there may be mentioned pigments of the azo, thioindigo, anthraquinone, anthanthrone, isobenzanthrone or triphendioxazine series, vat dye pigments, phthalocyanine pigments such as copper phthalocyanine and its nuclear halogenated derivatives and copper tetraphenyl and octaphenyl phthalocyanines, quinacridone pigments and lakes of acid, basic and mordant dyestuffs. Such pigments are described in, for example, volume 2 of the 2nd edition of the Colour Index which was published in 1956 under the heading "Pigments" and in subsequent authorised amendments thereto.

The dispersants of the invention are particularly valuable in converting crude copper phthalocyanine to pigmentary form. The term "crude copper phthalocyanine" denotes the product obtained directly from the manufacturing process, and whilst it is reasonably pure from the chemical point of view the product at this stage is of no value as a pigment as its particle size (about $10\mu$ to $100\mu$) is too large. By milling the crude copper phthalocyanine with a dispersant of the invention and a solvent this crude pigment is converted directly to a pigmentary form of suitable particle size.

As examples of dyestuffs there may be mentioned dyestuffs of the azo series, including monoazo and diazo dyestuffs and metalised derivatives thereof, anthraquinone, nitro, phthalocyanine, methine, styryl, naphthoperinone, quinphthalone, diarylmethane, triarylmethane, xanthine, azine, oxazine and thiazine series. Such dyestuffs can be disperse dyestuffs or water-soluble dyestuffs such as basic, acid, or direct dyestuffs, and if desired the dyestuffs can contain reactive groups, that is to say groups capable of forming covalent bonds with textile materials so that the dyestuffs become chemically attached to the textile materials. Examples of such classes of dyestuffs are given in the appropropriate sections of Volumes 1 and 2 of the second edition of Colour Index and the subsequent authorised amendments thereto.

The organic liquids used to prepare the said dispersions can be any inert organic liquids in which the said dispersing agents are at least partly soluble at ambient temperatures and which do not react with the dispersing agents or with the solids and are stable under the subsequent conditions of usage of the dispersion. If desired mixtures of organic liquids can be used. Preferred organic liquids are hydrocarbons and halogenated hydrocarbons such as benzene, toluene, vylene, white spirit, cyclohexane, and chlorobenzene, and, in particular, halogenated aliphatic hydrocarbons such as chloroform, carbon tetrachloride, trichloroethylene, perchloroethylene, 1:1:1-trichloroethane, methylene dichloride, tetrachloroethane, dibromoethylene and 1:1:2-trichloro-1:2:2-trifluoroethane. Other organic liquids can however be used, for example esters such as butyl acetate, ketones such as cyclohexanone, and heat bodied linseed oils used as lithographic varnish media. In general, the organic liquids or mixtures thereof used to prepare the dispersions will depend on the subsequent uses to which the dispersions are to be put.

If desired, and again depending on the end uses, the organic liquids can contain other materials dissolved therein, such as alkyd, nitrocellulose, acrylic, urea/formaldehyde, melamine/formaldehyde and other resins used in paint media, and zinc/calcium rosinates used in gravure ink media.

The dispersions of the invention are liquid and semi-fluid compositions containing the solid in finely divided well deflocculated form, and can be used for any purpose for which dispersions are conventionally used.

Dispersions of the invention which contain pigments as the solids are of particular value in the manufacture of pains for which purpose the dispersions are incorporated into conventional alkyd and other resins; alternatively such resins can be incorporated into the dispersion while it is being formed. The dispersions are also of value in the manufacture of printing inks, by incorporating the dispersions with the other components conventionally used in the manufacture of such inks.

The dispersions of the invention which contain dyestuffs or textile finishing agents as the solids are of particular value in solvent dyeing and solvent finishing processes for dyeing and finishing of textile materials.

The invention is illustrated but not limited by the following examples in which the parts and percentages are by weight:

EXAMPLE 1

A mixture of 240 parts of a 40% solution in white spirit of a copolymer obtained as described below and 5.5 parts of phenylisocyanate, is stirred for 3 hours at 20° C. 0.2 part of stannous octoate is then added and the mixture stirred for 20 hours at 20° C. by which time all the isocyanate has reacted as indicated by the disappearance of the absorption band at 2200 cm.$^{-1}$ in the infra-red spectrum. The infra-red spectrum contains bands at 3350 cm.$^{-1}$, 1540 cm.$^{-1}$ and 1210 cm.$^{-1}$ which arise from the presence of urethane groups.

The resulting solution contains 41.5% of the reaction product.

Similar products are obtained by replacing the 0.2 part of stannous octoate used as catalyst by the same amounts of N:N-dimethylcyclohexylamine, dibutyl tin dilaurate, diazabicyclooctane, or a mixture of equal parts of stannous octoate and diazabicyclooctane.

The copolymer used in the above example was obtained as follows:

Stage 1

| | Parts |
|---|---|
| Poly(hydroxystearic)acid (M.W. about 1800) | 900 |
| Aliphatic/aromatic hydrocarbon (boiling range 155°–195° C.) (i.e. white spirit) | 900 |
| Glycidyl methacrylate | 134 |
| Hydroquinone | 1 |
| Dimethyl laurylamine | 2 |

The mixture was heated with stirring under reflux and maintained at this temperature (about 140° C.) until as a result of esterification of the acid with the glycidyl methacrylate the acid value of the mixture fell below 1.0 (acid value is defined as the number of milligrams of potassium hydroxide required to neutralise 1 gram of the solid content of the mixture).

Stage 2

A vessel was charged with 400 parts of the hydrocarbon used in Stage 1, and, over a period of 5 hours, the following mixture was drip fed into the vessel.

| | Parts |
|---|---|
| Vinyl toluene | 112 |
| Styrene | 70 |
| Polymer solution from Stage 1 | 387 |
| Azodiisobutyronitrile | 8 |

Throughout this period the temperature was maintained at 85–90° C. Further additions of azodiisobutyronitrile (4 parts each time) being made after 5, 7, 9 and 11 hours heating at the same temperature, and heating was then continued for a further hour after the last addition of the azodiisobutyronitrile.

Stage 3

A mixture of 500 parts of the solution of the copolymer from Stage 2, 3.5 parts of p-aminobenzoic acid and 0.2 part of dimethyllaurylamine was then heated at 140° C. until the acid value of the mixture had fallen to 0.2. The concentration of the polymer solution was then adjusted to 40% by weight by addition or of white spirit.

EXAMPLE 2

By replacing the 5.5 parts of phenylisocyanate used in Example 1 by 5.8 parts of cyclohexylisocyanate and stirring the mixture for 4 days at 20° C., a 41.5% solution of the corresponding reaction product is obtained.

EXAMPLE 3

A stirred mixture of 1653 parts of a 40% solution in white spirit of a copolymer obtained as described below, 76 parts of phenylisocyanate and 2.8 parts of diazabicyclooctane is heated during 65 minutes to 50° C., and the temperature then maintained for 110 minutes. The mixture is then filtered to remove a small amount of insoluble diphenylurea, giving a 42.5% solution of the reaction product. The infra-red spectrum contains absorption bands at 1530 cm.$^{-1}$ and 1200 cm.$^{-1}$ which arise from the presence of urethane groups.

The copolymer solution used in the above example was obtained as follows:

A vessel was charged with 400 parts of white spirit, and, over a period of 5 hours, the following mixture was drip fed into the vessel,

| | Parts |
|---|---|
| Polymer solution obtained as described in Stage 1 given at the end of Example 1 above | 387 |
| Vinyltoluene | 87 |
| Styrene | 87 |
| Glycidyl methacrylate | 8 |
| Azo-diisobutyrontrile | 8 |

Throughout this period the temperature was maintained at 85–90° C. Further additions of azodiisobutyronitrile (4 parts each time) being made after 5, 7, 9 and 11 hours heating at the same temperature, and heating was then continued for a further hour after the last addition of the azodiisobutyronitrile.

A mixture of 500 parts of the resulting solution, 5.8 parts of p-aminobenzoic acid and 0.2 part of dimethyllaurylamine was then treated at 140° C. until the acid value of the mixture had fallen to 0.2. The concentration of the copolymer solution was then adjusted to 40%.

EXAMPLE 4

11.7 parts of a commercially available mixture of oleyl and cetyl alcohols are dissolved in 119 parts of the 40% solution in white spirit of the copolymer obtained as described under Stages 1 to 3 in Example 1 above, and 8 parts of an 80:20 mixture of 2:4- and 2:6-tolylenediisocyanates are quickly added, followed by 0.2 part of diazabicyclooctane. The temperature of the mixture is then raised to 50° C. during 1 hour and is maintained at this temperature for a further 2 hours.

The resulting solution contained 48.4% of the reaction product.

The infra-red spectrum contains bands at 3320 cm.$^{-1}$, 1540 cm.$^{-1}$, 1230 cm.$^{-1}$ and 1080 cm.$^{-1}$ which arise from the presence of urethane groups.

EXAMPLE 5

A solution of 4.9 parts of N-methylaniline in 30 parts of a petroleum fraction boiling at 100° to 120° C. is added with stirring to 8 parts of an 80:20 mixture of 2:4- and 2:6-tolylene-diisocyanates at a temperature below 30° C. The mixture is stirred for a further 10 minutes and 119 parts of the 40% solution in white spirit of the copolymer obtained as described under Stages 1 to 3 in Example 1 above are added followed by 0.2 part of diazabicyclooctane. The mixture is stirred for 75 minutes at 20° C., the temperature is raised to 50° C. during 30 minutes and is maintained for a further 2 hours.

The resulting solution contains 36.4% of the reaction product.

EXAMPLE 6

3.4 parts of isobutanol is added with stirring to 8 parts of an 80:20 mixture of 2:4- and 2:6-tolylenediisocyanates in 30 parts of a petroleum fraction boiling at 100 to 120° C. The mixture is stirred for 50 minutes and 119 parts of 40% solution in white spirit of the copolymer obtained as described under Stages 1 to 3 in Example 1 above are then added followed by 0.2 part of diazabicyclooctane. The mixture is stirred for 75 minutes at 20° C., the temperature is raised to 50° C. during 30 minutes, and is then maintained for a further 2 hours.

The resulting solution contains 36.9% of the reaction product.

EXAMPLE 7

In place of the stated amounts of the 40% solution in white spirit of the copolymer obtained as described under Stages 1 to 3 in Example 1, used in any of Examples 1, 2, 4, 5 and 6 there can be used the same amounts of the 40% solutions of the copolymers A and B obtained as described below, when similar reaction products are obtained.

Copolymer A

A vessel was charged with 365 parts of white spirit, and, over a period of 5 hours, the following mixture was drip fed into the vessel,

| | Parts |
|---|---|
| Polymer solution obtained as described in Stage 1 given at the end of Example 1 above | 464 |
| Vinyl toluene | 83 |
| Styrene | 52 |
| Glycidyl methacrylate | 5 |
| Azodiisobutyronitrile | 8 |

Throughout this period the temperature was maintained at 85°–95° C. Further additions of azodiisbutyronitrile (4 parts each time) being made after 5, 7, 9 and 11 hours heating at the same temperature, and heating was then continued, for a further hour after the last addition of the azodiisobutyronitrile.

A mixture of 500 parts of the resulting solution 5.8 parts of p-aminobenzoic acid and 0.2 part of dimethyllaurylamine was then heated at 140° C. until the acid value of the mixture had fallen to 0.2. The concentration of the copoymer solution was then adjusted to 40%.

Copolymer B

The process used for the preparation of copolymer A was repeated except that 436 parts of white spirit were charged to the vessel followed by a mixture comprising:

| | Parts |
|---|---|
| Polymer solution obtained as described in Stage 1 given at the end of Example 1 above | 310 |
| Vinyltoluene | 155 |
| Styrene | 58 |
| Glycidyl methacrylate | 10 |
| Azodiisobutyronitrile | 8 |

EXAMPLE 8

In place of the 4.9 parts of N-methylaniline used in Example 5 there are used 5.9 parts of dibutylamine, whereby a solution is obtained containing 37.8% of a similar reaction product.

EXAMPLE 9

A mixture of 3 parts of β-copper phthalocyanine, 1.8 parts of the 41.5% solution of the reaction product obtained as described in Example 1 using diazabicyclooctane as the catalyst and 5.2 parts of a petroleum fraction boiling within the range of 100° to 120° C., is ball milled for 16 hours to give a finely divided well deflocculated dispersion of the pigment which is suitable for use in a gravure printing ink.

Finely divided well deflocculated dispersions are prepared in a similar manner from the following pigments:

(a) α-partially chlorinated copper phthalocyanine.
(b) α-copper phthalocyanine.
(c) A mixture of α-partially chlorinated copper phthalocyanine and a basic copper phthalocyanine described in British specification No. 1,082,967.
(d) Polychloro copper phthalocyanine.
(e) The disazo pigment obtained by coupling tetrazotised 3:3′-dichlorobenzidine with acetoacet-m-xylidide.
(f) The calcium lake of 1-(2′-sulpho-4′-methylphenylazo)-2-naphthol-3-carboxylic acid.
(g) 1-(2′-nitro-4′-methylphenylazo)-2-naphthol.

EXAMPLE 10

In place of the 1.8 parts of the 41.5% solution of the reaction product used in Example 9 there are used 1.8 parts of any of the other solutions of reaction products obtained as described in Examples 1 to 8 whereby similar finely divided well deflocculated dispersions of β-copper phthalocyanine are obtained.

EXAMPLE 11

A mixture of 1 part of β-(2′-nitro-4′-chlorophenylazo) acetoacet-2-chloroanilide, 0.48 part of the 41.5% solution of the reaction product obtained as described in Example 1 using diazabicyclooctane as the catalyst, and 7.7 parts of a petroleum fraction boiling within the range of 100° to 120° C. is ball milled for 16 hours to give a finely divided well deflocculated dispersion of the pigment.

EXAMPLE 12

90 parts of crude copper phthalocyanine, 58.5 parts of the 42.5% solution in white spirit of the reaction product obtained as described in Example 3, and 151.5 parts of a light petroleum fraction boiling at 100° C. to 120° C. are stirred together in a stainless steel vessel and 1,000 parts of glass beads having a diameter of 0.6 to 0.7 mm. are added. Stirring is continued for 60 minutes at 1,200 r.p.m., by which time the pigment dispersion contains no significant number of particles above 3 microns, and the majority are 1 micron or less. The pigment dispersion is then separated from the beads, and consists essentially of a β-copper phthalocyanine pigment dispersion of high tinctorial strength and possessing greenness and brightness of shade when used in a gravure printing ink.

EXAMPLE 13

A mixture of 158 parts of a 40% solution in white spirit of a copolymer obtained as described in Example 1 except that the p-aminobuenzoic acid used in stage 3 was replaced by an equivalent amount of p-nitrobenzoic acid, 5.45 parts of phenyl isocyanate and 0.2 part of diazabicyclooctane is stirred for 45 minutes at 20° C. The temperature is then raised to 50° C. during 30 minutes and held at 50° to 55° C. for 18 hours by which time all the isocyanate groups have reacted as indicated by the disappearance of the absorption band at 2200 cm.$^{-1}$ in the infra-red spectrum. The infra-red spectrum contains bands at 3320 cm.$^{-1}$, 1530 cm.$^{-1}$ and 1215 cm.$^{-1}$ which arise from the presence of urethane groups.

The resulting solution contains 42.1% of the reaction product.

When tested as a dispersing agent for β-copper phthalocyanine as described in Example 9 it gives a finely divided well deflocculated dispersion of the pigment.

EXAMPLE 14

A mixture of 308 parts of a 47.7% solution in white spirit of a copolymer obtained as described in Example 2 of British specification No. 1,159,252, 5.45 parts of phenyl isocyanate and 0.2 part of diazabicyclooctane is stirred for 45 minutes at 20° C. The temperature is then raised to 50° C. during 30 minutes and held at 50° to 55° C. for 18 hours by which time all the isocyanate groups have reacted as indicated by the disappearance of the absorption band at 2200 cm.$^{-1}$ in the infra-red spectrum. The infra-red spectrum contains bands at 3325 cm.$^{-1}$ and 1540 cm.$^{-1}$ which arise from the presence of urethane groups.

The resulting solution contains 48.6% of the reaction product.

EXAMPLE 15

A mixture of 1 part of polychloro copper phthalocyanine 1 part of the 48.6% solution of the reaction obtained as described in Example 14 above, and 8 parts of a petroleum fraction boiling within the range of 100° to 120° C. is ball milled for 16 hours to give a finely divided well deflocculated dispersion of the pigment.

A similar result is obtained using the calcium lake of 1-(2'-sulpho-4'-methylphenylazo)-2-naphthol-3 - carboxylic acid in place of the polychloro copper phthalocyanate.

EXAMPLE 16

A mixture of 3 parts of 3-cyano-4-methyl-5-(m-nitrophenylazo)-2:6-dihydropyridine, 1.8 parts of the 42.5% solution of the reaction product obtained as described in Example 3 above, and 5.2 parts of a petroleum fraction boiling within the range of 100 to 120° C. is ball milled for 16 hours to give a finely divided well deflocculated dispersion of the azo compound which is suitable for use in a gravure printing ink.

A similar result is obtained when the above azo compound is replaced by 1-ethyl-3-cyano-4-methyl-5-(m-nitrophenylazo)-6-hydroxypyrid-2-one.

EXAMPLE 17

A mixture of 1 part of magnesium chloride hexahydrate, 1.2 parts of the 42.5% solution of the reaction product of Example 3 and 14.7 parts of perchloroethylene is ball milled for 16 hours to give a finely divided well deflocculated dispersion of magnesium chloride, which is suitable for use as a catalyst for polymerising anti-crease resins when applied to textile materials from a solvent.

EXAMPLE 18

A mixture of 1 part of the disodium salt of 4:4'-bis[4''- (β-hydroxyethylamino)-6''-anilino-1'':3'':5''-triazin - 2''- ylamino]stilbene-2:2'-disulphonic acid, 1.2 parts of the 42.5% solution of the reaction product obtained as described in Example 3 above, and 14.7 parts of perchloroethylene is ball milled for 20 hours to give a finely divided well deflocculated dispersion of the stilbene compound which can be used for the optical brightening of textile materials.

Similar finely divided well deflocculated dispersions can be obtained by replacing the stilbene compound by (a) the sodium salt of 1-amino-4-anilinoanthraquinone-2-sulphonic acid,
(b) 2-hydroxy-5-methyl-4'-[4''-chloro-6''-di(β - hydroxyethyl)amino-1'':3'':5''-triazin - 2'' - ylamino)azobenzene, or
(c) 4'-nitro-4-aminoazobenzene.

The resulting solvent dispersion of dyestuffs can be used for colouring textile materials by solvent dyeing methods.

EXAMPLE 19

A mixture of 45 parts of the azo compound obtained by coupling diazotised 4-chloro-2-nitroaniline with acetoacet-o-chloroanilide, 13.4 parts of the 42.5% solution of the reaction product of Example 3 and 49.3 parts of white spirit is ball milled for 16 hours. The resulting dispersion has a viscosity of 0.3 poise.

In comparison, a dispersion made by the above procedure except that the 13.4 parts of the 42.5% solution of the reaction product of Example 3 were replaced by 14.2 parts of the 40% solution of the copolymer used as starting material in Example 3 had a viscosity of 5 poises.

When equal amounts of the above two dispersions were separately incorporated into an air drying gloss paint based on a long oil length (linseed oil) alkyd resin containing a mixture of cobalt and lead driers which were subsequently tested for colour strength by incorporation into a white base paint, the paint which had been prepared from the dispersion containing the reaction product of Example 3 gave 8% more colour yield than the paint which had been prepared from the dispersion containing the copolymer used as starting material in Example 3.

We claim:

1. A dispersion of a solid in an organic liquid containing dissolved therein a dispersant comprising the reaction product of (a) a compound of the formula:

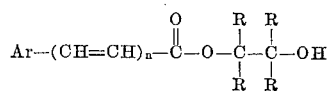

wherein Ar is an aromatic group, $n$ is 0 or 1, from 2 to 3 R groups are individually hydrogen, methyl and ethyl and the remaining R group or groups individually or the remaining group R—C—C—R in combination provides a solvatable chain-like component of at least 12 links, or (b) an addition polymer compound which is solvated by an organic liquid and which contain at least one group of the formula:

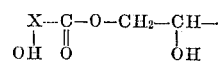

wherein X is an aliphatic radical which optionally contains an additional hydroxy group or groups, with an organic monoisocyanate or with an organic diisocyanate which has already been or is simultaneously or subsequently reacted with an alcohol or amine so that in effect it behaves as a monoisocyanate.

2. A dispersion as claimed in claim 1 wherein the solid is an organic pigment.

3. A dispersion as claimed in claim 1 wherein the organic pigment is copper phthalocyanine or a nuclear halogenated derivative thereof.

4. A dispersion of a copper phthalocyanine pigment in a petroleum fraction containing dissolved therein a dispersant comprising the reaction product of phenylisocyanate with a poly (hydroxystearic) acid, glycidyl methacrylate, vinyltoluene, styrene copolymer.

References Cited

UNITED STATES PATENTS 3,433,753   3/1969   Farkas et al. _____ 106—308 Q

FOREIGN PATENTS 1,108,261   3/1968   Great Britain _____ 106—308 Q
1,159,252   7/1969   Great Britain _____ 106—308 Q DELBERT E. GANTZ, Primary Examiner J. V. HOWARD, Assistant Examiner U.S. Cl. X.R.

106—308 N